United States Patent
Saito et al.

(10) Patent No.: US 10,878,272 B2
(45) Date of Patent: Dec. 29, 2020

(54) INFORMATION PROCESSING APPARATUS, INFORMATION PROCESSING SYSTEM, CONTROL METHOD, AND PROGRAM

(71) Applicant: NEC Corporation, Tokyo (JP)

(72) Inventors: Yasuji Saito, Tokyo (JP); Yuji Kaneda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 16/327,174

(22) PCT Filed: Jun. 7, 2017

(86) PCT No.: PCT/JP2017/021090
§ 371 (c)(1),
(2) Date: Feb. 21, 2019

(87) PCT Pub. No.: WO2018/037665
PCT Pub. Date: Mar. 1, 2018

(65) Prior Publication Data
US 2019/0188514 A1 Jun. 20, 2019

(30) Foreign Application Priority Data
Aug. 22, 2016 (JP) .................................. 2016-161726

(51) Int. Cl.
*G06K 9/36* (2006.01)
*H04N 9/804* (2006.01)
(Continued)

(52) U.S. Cl.
CPC ........... *G06K 9/36* (2013.01); *G06K 9/00771* (2013.01); *G06K 9/2054* (2013.01);
(Continued)

(58) Field of Classification Search
CPC ... G06T 1/0021; G06T 1/0028; G06T 1/0064; G06T 1/0071; G06T 2201/0065;
(Continued)

(56) References Cited

U.S. PATENT DOCUMENTS 7,146,031 B1 * 12/2006 Hartman ............... G06T 7/0012
382/132
10,002,301 B1 * 6/2018 Mahmoud ............. G06F 40/174
(Continued)

FOREIGN PATENT DOCUMENTS

JP 09-027952 A 1/1997
JP 2002-354502 A 12/2002
(Continued)

OTHER PUBLICATIONS

International Search Report of PCT/JP2017/021090 dated Jul. 4, 2017.

*Primary Examiner* — Nimesh Patel
(74) *Attorney, Agent, or Firm* — Sughrue Mion, PLLC

(57) ABSTRACT

A first analysis unit (202) acquires second image data. The second image data is generated by compressing first image data by a predetermined encoding method. Further, the first analysis unit (202) performs image analysis of the acquired second image data to detect second image data satisfying a first predetermined condition. A decoding unit (204) decodes second image data detected by the first analysis unit (202) into third image data having higher resolution than that of the second image data. In the second analysis (206), the image analysis of the third image data is performed.

8 Claims, 13 Drawing Sheets

(51) Int. Cl.
| | |
|---|---|
| *H04N 5/765* | (2006.01) |
| *H04N 5/91* | (2006.01) |
| *G06T 7/20* | (2017.01) |
| *H04N 7/18* | (2006.01) |
| *G06K 9/00* | (2006.01) |
| *G06K 9/20* | (2006.01) |
| *G06K 9/62* | (2006.01) |
| *H04N 5/917* | (2006.01) |
| *H04N 7/01* | (2006.01) |

(52) U.S. Cl.
CPC .............. *G06K 9/6215* (2013.01); *G06T 7/20* (2013.01); *H04N 5/765* (2013.01); *H04N 5/91* (2013.01); *H04N 5/917* (2013.01); *H04N 7/0117* (2013.01); *H04N 7/18* (2013.01); *H04N 9/8042* (2013.01)

(58) Field of Classification Search
CPC ......... G06T 7/0002; G06T 2207/10024; G06T 7/0004; G06T 11/60; G06T 2207/20192; G06T 2207/30242; G06T 3/403; G06T 7/12; G06T 7/13; G06T 3/40; G06T 7/0012; G06T 17/00; G06T 17/005; G06T 17/05; G06T 2207/10061; G06T 2210/36; G06T 2210/56; G06T 5/009; G06T 9/00; G06T 9/001; G06T 7/11; G06T 11/40; G06T 11/00; G06T 11/001; G06T 15/503; G06T 2200/24; G06T 2207/10008; G06T 2207/10016; G06T 2207/30176; G06T 5/002; G06T 5/003; G06T 7/0014; G06T 7/162; G06T 2207/10056; G06T 2207/30004; G06T 2207/30072; G06T 9/005; G06T 7/20; B42D 25/23; B42D 25/00; B42D 2033/20; B42D 2035/24; B42D 25/328; B42D 25/29; B42D 25/43; B42D 25/24; B42D 25/309; G06K 9/46; G06K 7/10702; G06K 7/1098; G06K 9/00013; G06K 19/06037; G06K 9/4604; G06K 2207/1012; G06K 7/10712; G06K 9/2036; G06K 2209/01; G06K 9/00201; G06K 9/00805; G06K 9/4652; G06K 9/74; G06K 9/6212; G06K 9/00; G06K 9/00456; G06K 9/325; G06K 9/6256; G06K 9/6262; G06K 9/66; G06K 9/00744; G06K 9/00771; G06K 9/36; G06K 9/6215; G03F 1/36; G03F 1/70; G03F 1/42; G03F 1/76; G03F 7/70441; G06F 3/018; G06F 40/174; G06F 3/12; G06F 3/1454; G06F 16/14; G06F 16/38; G06F 16/51; G06F 16/583; G06F 19/321; G06F 19/3418; G06F 21/6245; G09G 2320/0613; G09G 2320/103; G09G 2340/02; G09G 2350/00; G09G 2370/022; G09G 5/003; H04L 65/80; H04L 69/04; H04L 63/108; H04L 67/10; H04L 5/0053; H04L 5/006; H04L 5/0064
See application file for complete search history.

(56) References Cited

U.S. PATENT DOCUMENTS

| | | | |
|---|---|---|---|
| 2006/0050788 A1* | 3/2006 | Techmer | G06K 9/228 375/240.12 |
| 2010/0141763 A1 | 6/2010 | Itoh et al. | |
| 2011/0007823 A1* | 1/2011 | Matsuo | G06K 9/00369 375/240.26 |
| 2013/0182950 A1* | 7/2013 | Morales | H04N 1/4072 382/167 |
| 2015/0256835 A1 | 9/2015 | Sakai | |
| 2018/0099521 A1* | 4/2018 | Wu | B42D 25/23 |

FOREIGN PATENT DOCUMENTS

| | | |
|---|---|---|
| JP | 2004-260462 A | 9/2004 |
| JP | 2007-214886 A | 8/2007 |
| JP | 2008-124626 A | 5/2008 |
| JP | 2009-246935 A | 10/2009 |
| JP | 2010-136032 A | 6/2010 |
| JP | 2015-170874 A | 9/2015 |

* cited by examiner

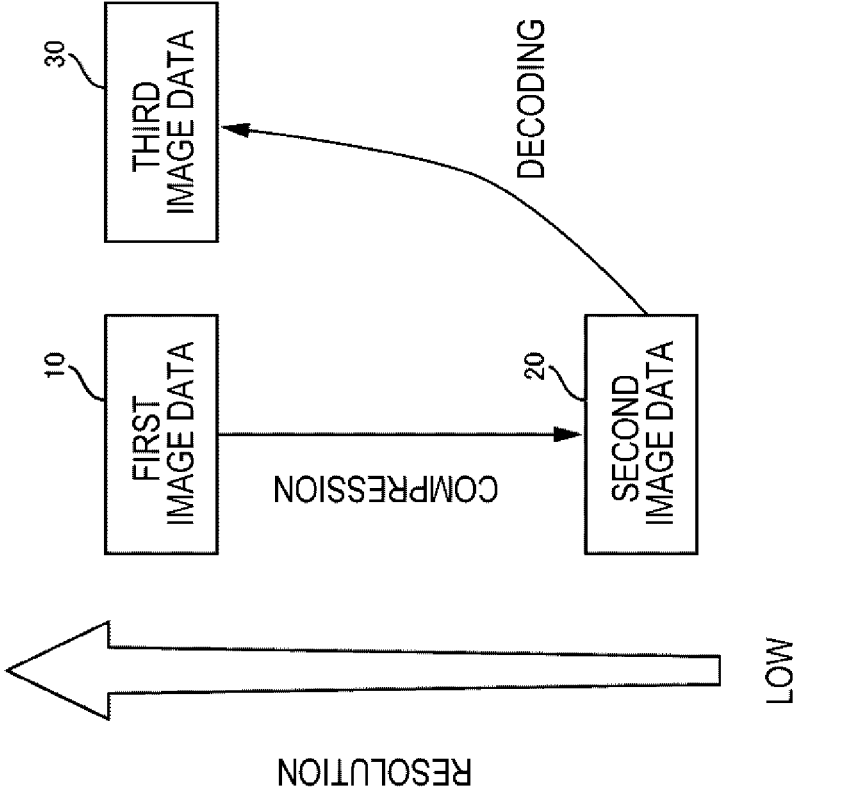
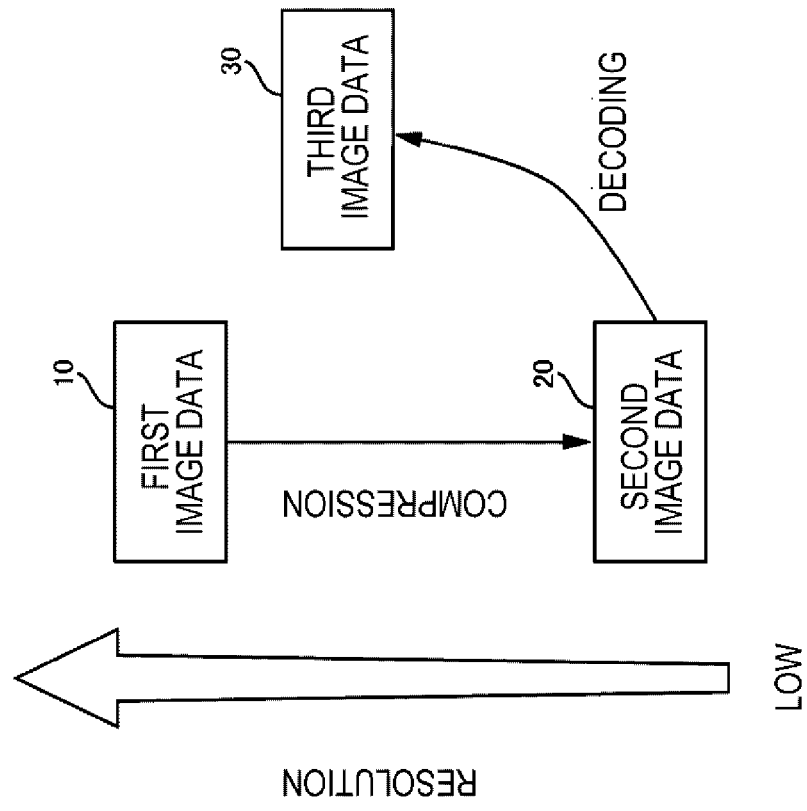

INFORMATION PROCESSING APPARATUS, INFORMATION PROCESSING SYSTEM, CONTROL METHOD, AND PROGRAM

CROSS REFERENCE TO RELATED APPLICATIONS

This application is a National Stage of International Application No. PCT/JP2017/021090 filed Jun. 7, 2017, claiming priority based on Japanese Patent Application No. 2016-161726 filed Aug. 22, 2016, the disclosures of which are incorporated herein in their entirety.

TECHNICAL FIELD

The present invention relates to an information processing apparatus, an information processing system, a control method, and a program.

BACKGROUND ART

Cameras are used for surveilling a building or the like. For example, in a case where an incident occurs in the vicinity of a certain building, a video of a surveillance camera of the building are used.

For example, Patent Document 1 discloses the related art regarding videos of cameras. Patent Document 1 discloses that a camera installed outside an entrance images a visitor. At this time, the video of the visitor is stored or displayed as a high resolution video with a lower compression ratio in a case where a change in the video is large, and stored or displayed as a low resolution image with a higher compression ratio in a case where the change in the video is small.

RELATED DOCUMENT

Patent Document

[Patent Document 1] Japanese Patent Application Publication No. 2004-260462

SUMMARY OF THE INVENTION

Technical Problem

Sometimes, the image analysis of a video of a camera is performed by a computer. In such a case, in order to perform image analysis with high accuracy, a high resolution image is used. Therefore, a processing load on the computer that performs the image analysis is increased. Patent Document 1 does not mention reducing the processing load of image analysis.

The present invention has been made in view of the problems. An object of the present invention is to provide a technique for reducing a processing load required for image analysis of the video of a camera.

Solution to Problem

A first information processing apparatus according to the present invention includes:(1) a first analysis unit that acquires second image data generated by compressing first image data by a predetermined encoding method, and performs image analysis of the second image data to detect second image data satisfying a first predetermined condition; (2) a decoding unit that decodes the detected second image data into third image data having higher resolution than that of the second image data; and (3) a second analysis unit that performs image analysis of the third image data.

An information processing system according to the present invention is an information processing system having a first information processing apparatus and a second information processing apparatus that are communicably connected to each other.

The first information processing apparatus includes a compressing unit that compresses first image data by a predetermined encoding method to generate second image data.

The second information processing apparatus includes: (1) a first analysis unit that acquires the second image data, and performs image analysis of the second image data to detect second image data satisfying a first predetermined condition; (2) a decoding unit that decodes the detected second image data into third image data having higher resolution than that of the second image data; and (3) a second analysis unit that performs image analysis of the third image data.

A first control method according to the present invention is executed by a computer.

The control method includes: (1) a first analysis step of acquiring second image data generated by compressing first image data by a predetermined encoding method, and performing image analysis of the second image data to detect the second image data satisfying a first predetermined condition; (2) a decoding step of decoding the detected second image data into third image data having higher resolution than that of the second image data; and (3) a second analysis step of performing image analysis of the third image data.

A second control method according to the present invention is executed in an information processing system having a first information processing apparatus and a second information processing apparatus that are communicably connected to each other.

The control method includes: (1) a compressing step of compressing the first image data by a predetermined encoding method to generate second image data, using the first information processing apparatus; (2) a first analysis step of acquiring the second image data and performing image analysis of the second image data to detect the second image data satisfying a first predetermined condition, using the second information processing apparatus; (3) a decoding step of decoding the detected second image data into third image data having higher resolution than that of the second image data, using the second information processing apparatus; and (4) a second analysis step of performing image analysis of the third image data, using the second information processing apparatus.

A program according to the present invention causes a computer to execute each step of the first control method according to the present invention.

A second information processing apparatus according to the present invention includes: (1) an acquiring unit that acquires image data obtained by encoding first image data by a predetermined encoding method; (2) a first decoding unit that decodes the acquired image data into second image data; (3) a first analysis unit that performs image analysis of the decoded second image data to detect second image data satisfying a first predetermined condition; (4) a second decoding unit that decodes the detected second image data into third image data having higher resolution than that of the second image data; and (5) a second analysis unit that performs image analysis of the third image data.

Advantageous Effects of Invention

According to the present invention, there is provided a technique for reducing the processing load required for image analysis of the video of a camera.

BRIEF DESCRIPTION OF THE DRAWINGS

The above objects and other objects, features and advantages will become more apparent from the following description of the preferable example embodiments and the accompanying drawings.

FIGS. 2A and 2B are diagrams illustrating a relationship between resolution of each image data.

DESCRIPTION OF EMBODIMENTS

Figure 1:
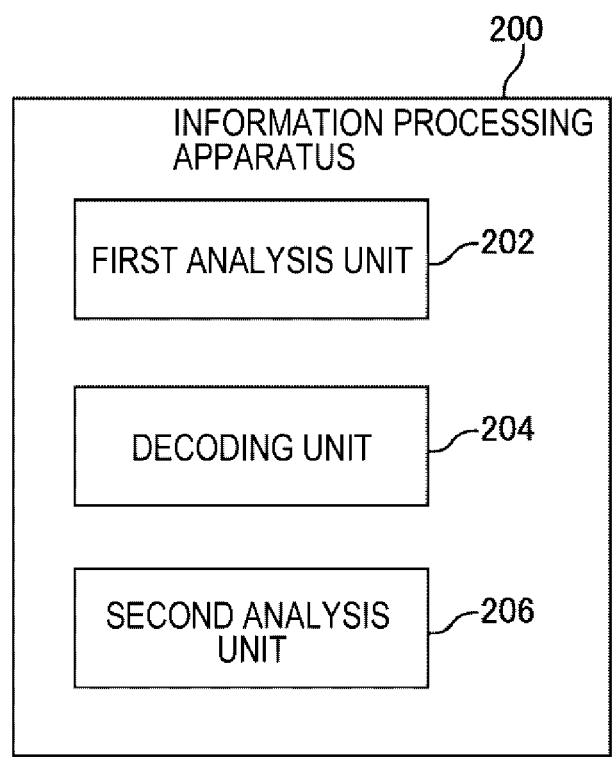
FIG. 1 is a block diagram illustrating an information processing apparatus according to a first example embodiment.

Hereinafter, example embodiments of the present invention will be described with reference to the drawings. In all the drawings, the same components are denoted by the same reference numerals, and descriptions thereof are not repeated. In each of the block diagrams, unless otherwise determined, each block does not represent a hardware unit, but a configuration of a functional unit.

First Example Embodiment

FIG. 1 is a block diagram illustrating the information processing apparatus 200 according to the first example embodiment. The information processing apparatus 200 includes a first analysis unit 202, a decoding unit 204, and a second analysis unit 206.

The first analysis unit 202 acquires the second image data. As the second image data, a compressed image obtained by encoding the first image data by a predetermined encoding method is generated. Furthermore, the first analysis unit 202 performs image analysis of the acquired second image data. In this way, the first analysis unit 202 detects the second image data satisfying a first predetermined condition. The second image data 20 satisfying the first predetermined condition is image data that needs to be decoded into image data with a higher resolution and subjected to further image analysis to be performed. Note that, details of the image analysis performed by the first analysis unit 202 and the first predetermined condition will be described later.

The decoding unit 204 decodes the second image data satisfying the first predetermined condition into third image data having higher resolution than that of the second image data. FIGS. 2A and 2B are diagrams illustrating the relationship between the resolution of each image data. The resolution of the second image data 20 is lower than the resolution of the first image data 10. The resolution of the third image data 30 is higher than the resolution of the second image data 20. The resolution of the third image data 30 may be lower than the resolution of the first image data 10 (see FIG. 2A) or may be the same as the resolution of the first image data 10 (see FIG. 2B).

The second analysis unit 206 performs image analysis of the third image data 30. Details of the image analysis performed by the second analysis unit 206 will be described later.

Figure 3:
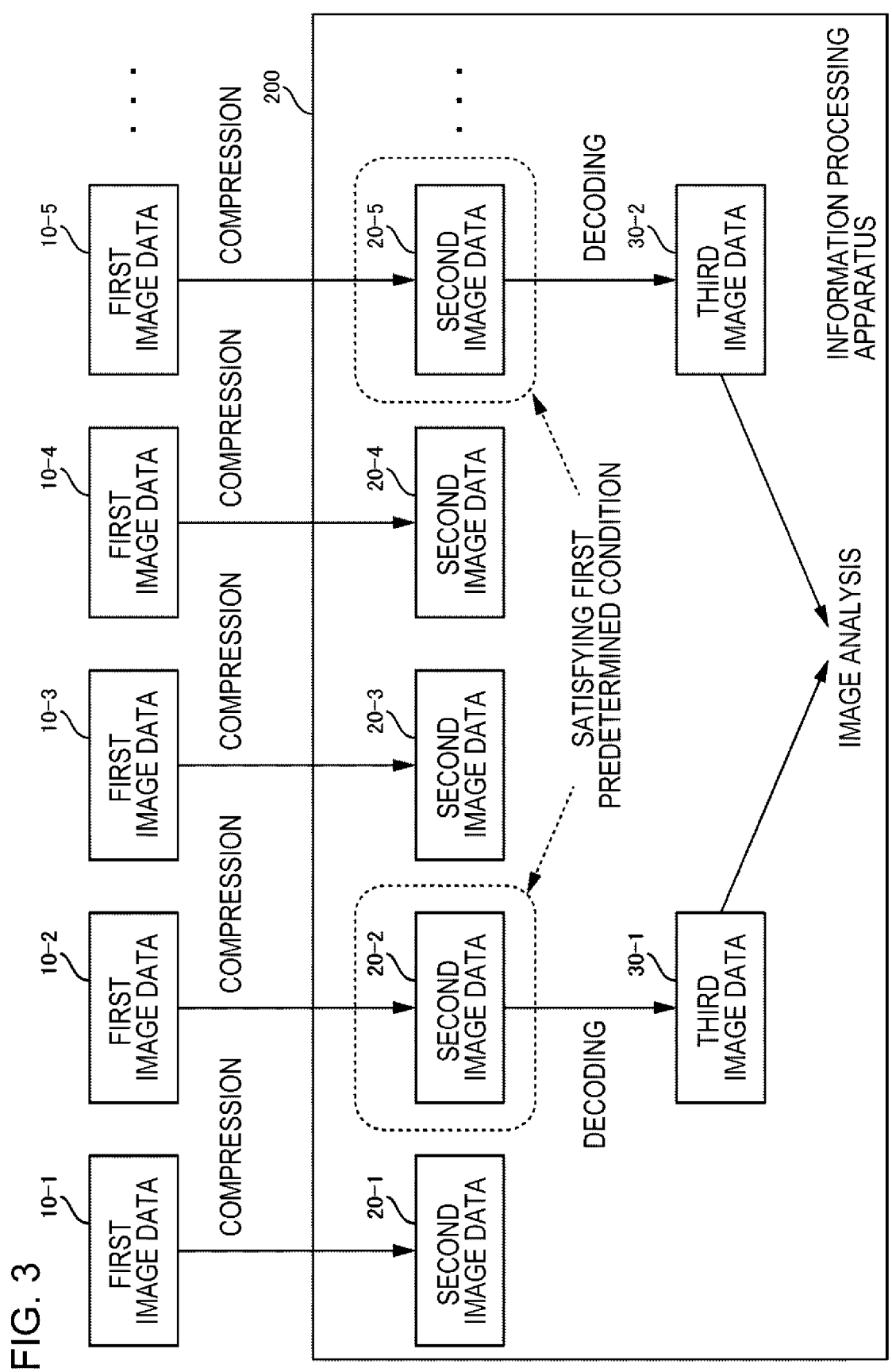
FIG. 3 is a diagram conceptually illustrating an operation of the information processing apparatus according to the first example embodiment.

FIG. 3 is a diagram conceptually illustrating an operation of the information processing apparatus 200 according to the first example embodiment. As described above, the second image data 20 is image data generated by compressing the first image data 10. For example, in FIG. 3, the second image data 20-1 is generated by compressing the first image data 10-1.

The first analysis unit 202 performs image analysis of each second image data 20 to detect the second image data 20 satisfying the first predetermined condition. In FIG. 3, the second image data 20-2 and the second image data 20-5 satisfy the first predetermined condition. There, the decoding unit 204 decodes each of the second image data 20-2 and the second image data 20-5 to generate the third image data 30-1 and the third image data 30-2. The second analysis unit 206 performs image analysis of the third image data 30-1 and the third image data 30-2.

In this way, the information processing apparatus 200 according to the example embodiment performs image analysis of the second image data 20 having a relatively low resolution to detect the second image data 20 (second image data 20 that needs to be decoded into image data with a higher resolution and subjected to further image analysis to be performed) satisfying the first predetermined condition. Then, the information processing apparatus 200 decodes the detected second image data 20 to generate the third image data 30, and further performs image analysis of the third image data 30.

Since the third image data 30 has a resolution higher than that of the second image data 20, the processing load of the image analysis of the third image data 30 is higher than the processing load of the image analysis of the second image data 20. According to the information processing apparatus 200 of the example embodiment, the number of the third image data 30 to be subjected to the image analysis is smaller, as compared with a case where image analysis is performed on all the third image data 30. Therefore, according to the example embodiment, the processing load on the information processing apparatus 200 caused by image analysis is reduced. Also, the time required for image analysis is shortened.

Hereinafter, further details of this example embodiment will be described.

Example of Hardware Implementing the Information Processing Apparatus 200

Each function configuration unit of the information processing apparatus 200 may be implemented by hardware (for example, a hard-wired electronic circuit) implementing each function configuration unit, or a combination of hardware and software (for example, a combination of an electronic circuit and a program for controlling the electronic circuit, and the like).

Figure 4:
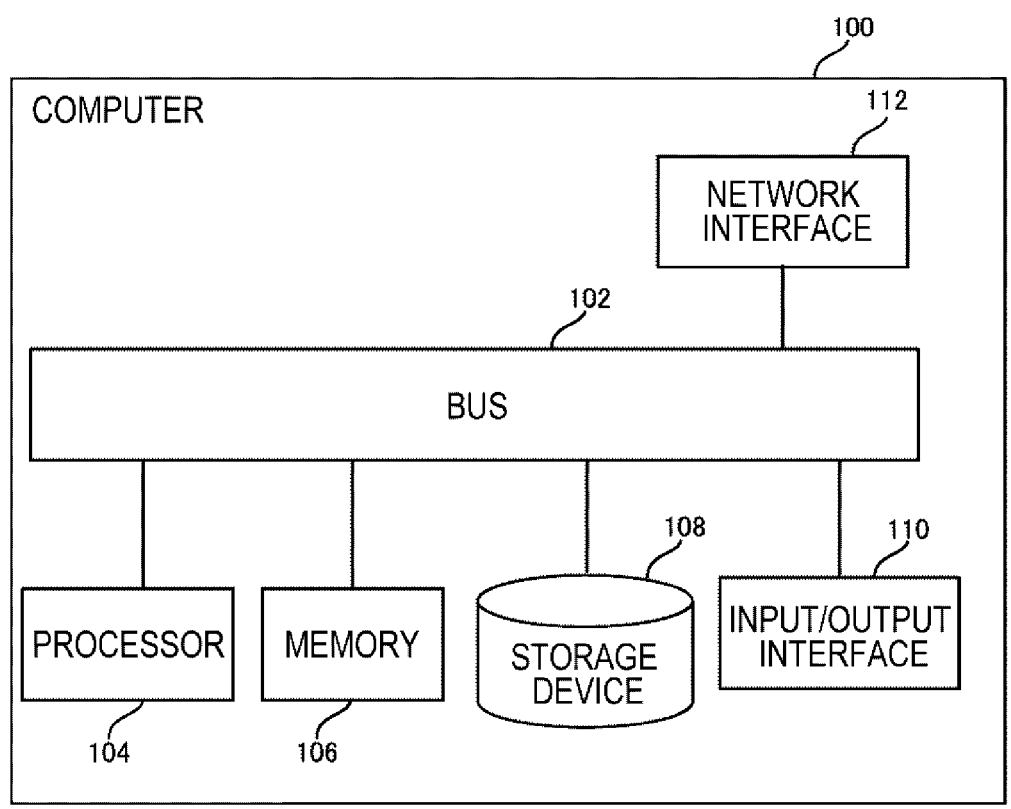
FIG. 4 is a diagram illustrating a computer for implementing an information processing apparatus.

FIG. 4 is a diagram illustrating the computer 100 for implementing the information processing apparatus 200. The computer 100 is a certain computer. For example, the computer 100 is a Personal Computer (PC), a server machine, a portable terminal (a tablet terminal or a smartphone), or the like. The computer 100 may be a special-purpose computer designed to implement the information processing apparatus 200 or may be a general-purpose computer.

The computer 100 includes a bus 102, a processor 104, a memory 106, a storage device 108, an input/output interface 110, and a network interface 112. The bus 102 is a data transmission path through which the processor 104, the memory 106, the storage device 108, the input/output interface 110, and the network interface 112 mutually transmit and receive data. However, the method of connecting the processor 104 and the like with one another is not limited to a bus connection.

The processor 104 is an arithmetic processor such as a Central Processing Unit (CPU) or a Graphics Processing Unit (GPU). The memory 106 is a memory implemented by using a Random Access Memory (RAM) or the like. The storage device 108 is a storage device implemented by using a hard disk, a Solid State Drive (SSD), a Read Only Memory (ROM), a flash memory, or the like.

The input/output interface 110 is an interface for connecting the computer 100 to a peripheral device. The network interface 112 is an interface for connecting the computer 100 to a communication network. A method for connecting the network interface 112 to the communication network may be a wireless connection or a wired connection.

The storage device 108 stores a program module for implementing each function of the information processing apparatus 200. The processor 104 implements each function of the information processing apparatus 200 by reading out the program module into the memory 106 and executing the program.

Flow of Processing

Figure 5:
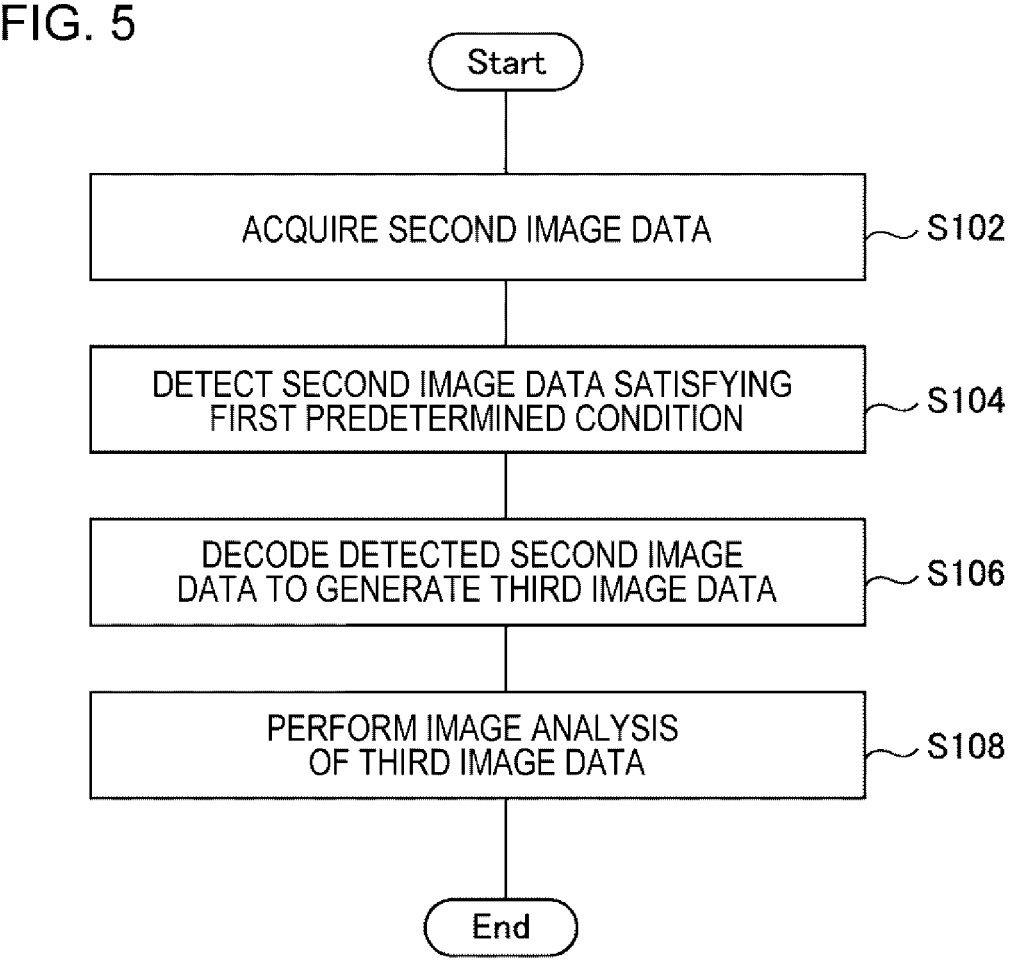
FIG. 5 is a flowchart illustrating a flow of processing executed by the information processing apparatus according to the first example embodiment.

FIG. 5 is a flowchart illustrating a flow of processing executed by the information processing apparatus 200 according to the first example embodiment. The first analysis unit 202 acquires the second image data 20 (S102). The first analysis unit 202 performs image analysis of the acquired second image data 20 to detect the second image data 20 satisfying the first predetermined condition (S104). The decoding unit 204 decodes the detected second image data 20 to generate third image data 30 (S106). The second analysis unit 206 performs image analysis of the third image data 30 (S108).

About First Image Data 10

As described above, the second image data 20 is generated by compressing the first image data 10. The first image data 10 is generated based on a result of imaging by a camera. This camera is any camera that may image surroundings to generate image data. For example, the camera is a surveillance camera provided in various places. For example, this surveillance camera is provided in a retail store such as a supermarket and a convenience store, an office, a house, and the like.

For example, the first image data 10 is non-compressed image data generated by a camera that has performed imaging. Also, for example, the first image data 10 may be image data generated by compressing the non-compressed image data. Hereinafter, the non-compressed image data generated by the camera that has performed imaging will be denoted by source image data.

Generation of Second Image Data

The second image data 20 is generated by compressing the first image data 10. The generation of the second image data 20 may be performed by a camera that has generated the source image data, or may be performed by an apparatus other than this camera.

The generated second image data 20 is stored in a storage device. This storage device is called a second image data storage device. The second image data storage device may be provided inside an apparatus that generates the second image data 20, or may be provided outside the apparatus.

An encoding method for generating the second image data 20 from the first image data 10 is optional. For example, the encoding method is JPEG, StarPixel (registered trademark), or the like.

Here, suppose that a video (such as images of the surveillance camera) is configured with a plurality of first image data 10. In this case, the second image data 20 may be generated by individually encoding each of the plurality of first image data 10, or may be generated by encoding the video configured with these first image data 10. Examples of a method of encoding a video include a method of encoding such as MPEG and H.261.

Acquiring of Second Image Data 20: S102

The first analysis unit 202 acquires the second image data 20 (S102). There are various methods in which the first analysis unit 202 acquires the second image data 20. For example, the first analysis unit 202 acquires the second image data 20 by reading out the second image data 20 from the second image data storage device described above. Also, for example, the first analysis unit 202 may acquire the second image data 20 by receiving the second image data 20 that has been transmitted by another apparatus (for example, an apparatus that generates the second image data 20).

Image Analysis of Second Image Data 20: S104

The first analysis unit 202 performs image analysis of the second image data 20 to detect the second image data 20 satisfying the first predetermined condition (S104). This image analysis is, for example, difference detection process or object detection process. Hereinafter, details of such processing will be described. Note that, the image analysis performed on the second image data may be an analysis process of the second image data itself, or may be an analysis process of image data obtained by decoding the second image data. Hereinafter, firstly, the analysis process of the second image data itself will be described and the analysis of the image data obtained by decoding the second image data will be described later.

Difference Detection Process

The first analysis unit 202 acquires a plurality of time-series second image data 20. Specifically, each second image data 20 is image data obtained by compressing each of a plurality of time-series first image data 10 generated from a result of imaging repeatedly performed by the camera.

The first analysis unit 202 detects a difference between each of the plurality of second image data 20 and other preceding or succeeding second image data 20 in the time series. Then, the first analysis unit 202 detects the second image data 20 in which the detected difference is equal to or more than a predetermined degree, as the second image data 20 satisfying the first predetermined condition. That is, the first predetermined condition is a condition that "a difference from other preceding or succeeding second image data 20 in the time series is equal to or more than a predetermined degree". Note that, a well-known algorithm may be used for an algorithm for the difference detection process.

Here, a method of representing a degree of the difference is optional. For example, the degree of the difference is represented by a size of the area of a region which is different from a preceding or succeeding second image data 20, out of a region included in the second image data 20. In this case, "the difference is equal to or more than a predetermined degree" may be rephrased as "the size of the area of a difference region is equal to or more than a predetermined value". The information indicating the predetermined degree may be preset by the first analysis unit 202, or may be stored in a storage device which is accessible to the first analysis unit 202.

By detecting the second image data 20 under such a first predetermined condition, the second image data 20 having a change of a predetermined degree or more in the imaged scenery is detected. Then, it may be considered that it is useful to decode the second image data 20 having a change of the predetermined degree or more in the scenery into the third image data 30 having a higher resolution, and to further perform image analysis. For example, in the case where the second image data 20 is image data configuring a video of the surveillance camera, there is a possibility that a suspicious person or the like is captured in the second image data 20 if a large change occurs in the scenery captured in the second image data 20. Therefore, by detecting the second image data 20 in which the change of the predetermined degree or more has occurred in the scenery using the first analysis unit 202, image data representing such a change in the scenery is made to be analyzed in the image analysis by the second analysis unit 206.

Note that, the first predetermined condition may be a condition that "the difference is equal to or less than a predetermined degree". It may be normal for some places imaged by a camera that the scenery changes. In such a case, it is useful to detect that there is no change in the scenery and analyze the image data representing the scenery where the change has disappeared.

Object Detection Process

The first analysis unit 202 performs object detection process of detecting a predetermined object with respect to the second image data 20. Then, the first analysis unit 202 detects the second image data 20 in which the predetermined object is detected, as the second image data 20 satisfying the first predetermined condition. That is, the first predetermined condition is a condition referred to as "including the predetermined object". Note that, a well-known algorithm may be used for an algorithm for the object detection process.

Here, an object to be treated as a "predetermined object" may be any objects. For example, the predetermined object is a person, a car, or the like. The information representing the predetermined object (for example, a feature of the predetermined object) may be preset by the first analysis unit 202, or may be stored in a storage device which is accessible to the first analysis unit 202.

By detecting the second image data 20 under such a first predetermined condition, the second image data 20 including a predetermined object is detected. Then, as described above, it may be considered that it is useful to decode the second image data 20 including the predetermined object into the third image data 30 having a higher resolution and further perform image analysis. For example, suppose that the second image data 20 is image data configuring a video of the surveillance camera and the predetermined object is a person. In this case, by decoding the second image data 20 including a person into the third image data 30 having a higher resolution and further performing image analysis, it is possible to determine whether or not the imaged person is a suspicious person. Therefore, by detecting the second image data 20 including the predetermined object in the first analysis unit 202, the image data including such the predetermined object is made to be analyzed in the image analysis by the second analysis unit 206.

Note that, the first predetermined condition may be a condition that "a predetermined object is not included". In this case, the first analysis unit 202 detects the second image data 20 in which the predetermined object is not included, as the second image data 20 satisfying the first condition.

The image analysis performed by the first analysis unit 202 is not limited to the difference detection process or the object detection process described above. The image analysis by the second analysis unit 206 is performed on the third image data 30 generated from the second image data 20 detected by the first analysis unit 202. Therefore, the image analysis performed by the first analysis unit 202 may be set to any process capable of detecting the second image data 20 that includes the scenery desired to be analyzed in the second analysis unit 206.

Which kind of image analysis is to be performed on the second image data 20 may be preset by the first analysis unit 202, or may be changed according to the settings of the user of the information processing apparatus 200. In the latter case, for example, the user of the information processing apparatus 200 stores information indicating the kind of image analysis to be performed on the second image data 20, into a storage device which is accessible to the first analysis unit 202. The first analysis unit 202 performs the set image analysis on the second image data 20 by reading out the information.

Analysis of image data obtained by decoding second image data

As described above, the image analysis performed by the first analysis unit 202 may be an analysis of image data obtained by decoding the second image data. This image analysis will be described below.

For example, the first analysis unit 202 causes the decoding unit 204 to decode the second image data 20, and analyzes the image data generated from a result of the decoding. In this decoding, image data having a resolution lower than the resolution of the first image data 10 is generated. In this case, the decoding unit 204 can perform decoding in multiple stages when decoding the second image data 20 to generate the first image data 10.

An encoding method of generating image data that may be decoded in multiple stages is, for example, a progressive encoding method. In addition, a decoding method of gradually decoding image data that may be decoded in multiple stages in this way is, for example, a progressive decoding method. A codec classified into progressive encoding and progressive decoding is, for example, StarPixel (registered trademark).

Figure 6:
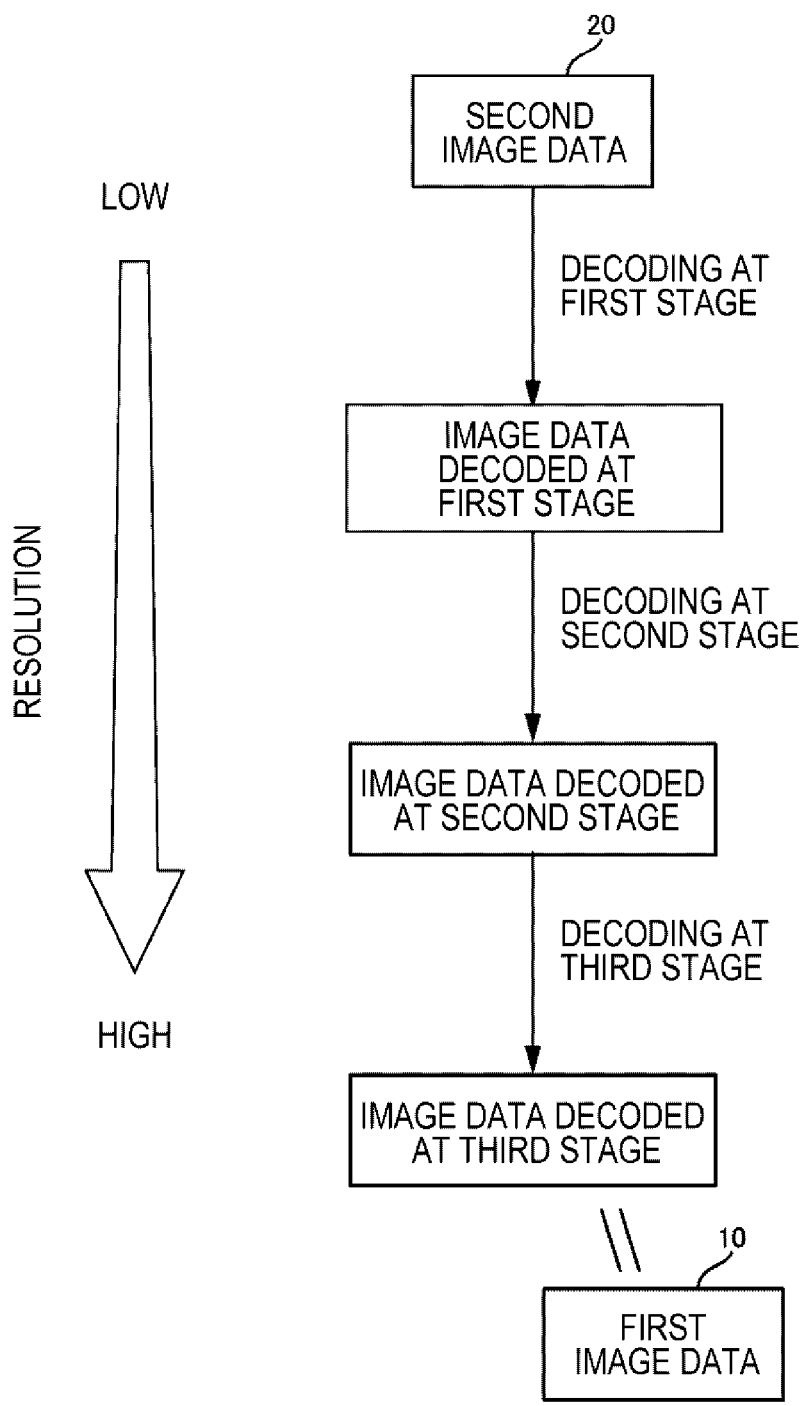
FIG. 6 is a diagram illustrating a situation of decoding a second image data 0 capable of being decoded in multiple stages.

FIG. 6 is a diagram illustrating a scene in which the second image data 20 that may be decoded in multiple stages is decoded. In the example of FIG. 6, the second image data 20 may be decoded in three stages. The resolution of each image data become higher in the order of: the second image data 20; the image data decoded at the first stage; the image data decoded at the second stage; and the image data decoded at the third stage (first image data 10).

The first analysis unit 202 causes the decoding unit 204 to generate the image data decoded at the first stage or the image data decoded at the second stage. Then, the first analysis unit 202 performs image analysis of the generated image data.

Figure 7:
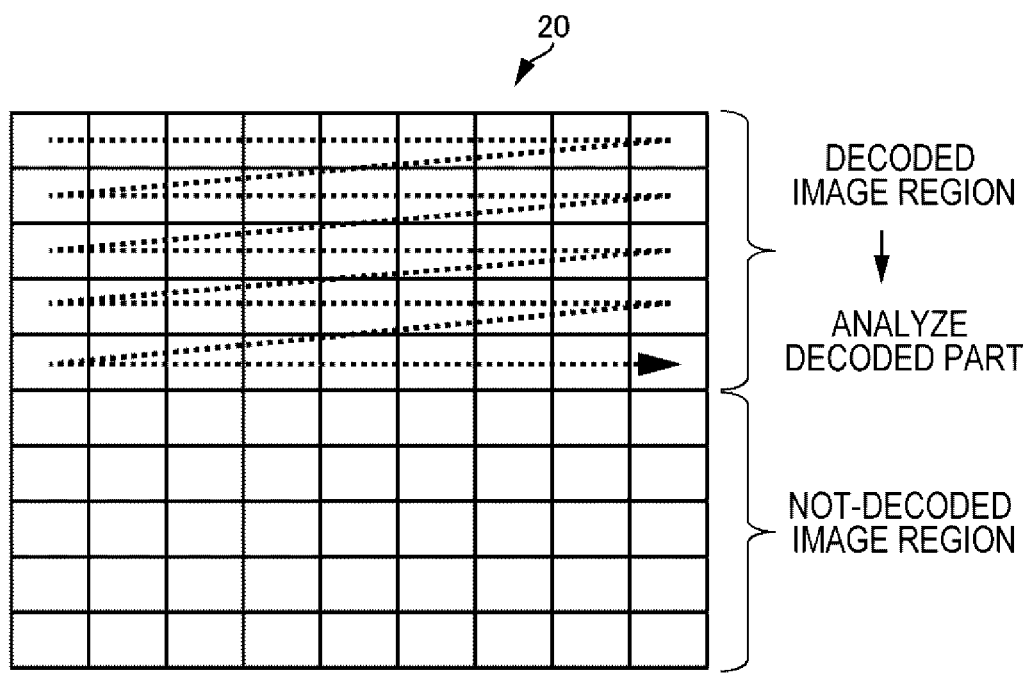
FIG. 7 is a diagram illustrating second image data 20 in which a part of an image region has been decoded.

In addition, the following method may be adopted for another decoding method. First, the decoding unit 204 decodes a part of an image region of the second image data 20. Then, the first analysis unit 202 analyzes the decoded image region. FIG. 7 is a diagram illustrating the second image data 20 in which a part of the image region has been decoded. In FIG. 7, an upper half of the image region of the second image data 20 is decoded. Therefore, the first analysis unit 202 performs image analysis of the upper half of the image region which has been decoded, among the image region included in the second image data 20. Thereby, the time required for the image analysis of the second image data 20 is shortened, as compared with a case where the entire image region of the second image data 20 are decoded and image analysis is performed.

Here, suppose the information processing apparatus 200 has a function of restoring the image of the camera by decoding the second image data 20 and providing the image to the user. For example, this is a case that a video of the surveillance camera is displayed on the display and a guard watches the image. In this case, the information processing apparatus 200 decodes the second image data 20 to generate the first image data 10 in order to restore the image of the camera. Image data (see FIG. 6) in which the progressive decoding has been partially performed on the second image data 20, or image data (see FIG. 7) in which decoding is performed on a part of the image region of the second image data 20 is, for example, generated in a process of restoring the image of the camera in this way. Therefore, the first analysis unit 202 may acquire the image data generated in the course of such process and may perform image analysis of the image data.

Note that, the contents of analysis process performed on the image data obtained by decoding the second image data are the same as the contents of the difference detection process or the object detection process described above.

Generation of Third Image Data 30: S106

The decoding unit 204 decodes the detected second image data 20 to generate third image data 30 (S106). The third image data 30 generated from the second image data 20 may be the same as image data of original first image data 10 of the second image data 20, or may be image data different from the first image data 10.

For example, the decoding unit 204 performs a process of decoding the second image data 20 into the original first image data 10. Then, the original first image data 10 is handled as the third image data 30. A well-known process may be used for the processing of decoding the compressed image into an original image.

In addition, suppose that the second image data is generated using an encoding method by which multiple stages of decoding is enabled (see FIG. 6). In this case, the decoding unit 204 decodes the second image data 20 to a certain stage, and the decoded image data handled as the third image data 30. For example, in the case of the example of FIG. 6, the decoding unit 204 generates the image data decoded at the first stage, the image data decoded at the second stage decoded, or the image data decoded at the third stage as the third image data 30.

There, as described above, the first analysis unit 202 performs image analysis of the image data (see FIG. 6) generated by decoding the second image data 20 such that the second image data has a resolution lower than the resolution of the first image data 10. In this case, the decoding unit 204 further generates the third image data by further decoding the image data used for the analysis by the first analysis unit 202.

For example, in the example of FIG. 6, suppose that the first analysis unit 202 performs image analysis of the image data decoded at the first stage. In this case, the decoding unit 204 generates the third image data 30 by further decoding the image data decoded at the first stage. Therefore, the third image data 30 is the image data decoded at the second stage or the image data decoded at the third stage.

Also, for example, in the example of FIG. 6, suppose that the first analysis unit 202 performs image analysis of the image data decoded at the second stage. In this case, the decoding unit 204 generates the third image data 30 by further decoding the image data decoded at the second stage. Therefore, the third image data 30 is the image data decoded at the third stage.

Also, suppose that a part of the image region of the second image data 20 is decoded, and the first analysis unit 202 performs image analysis on the decoded image region (see FIG. 7). In this case, the decoding unit 204 generates the third image data 30 by decoding the remaining image region not decoded by the first analysis unit 202.

Image Analysis of Third Image Data 30: S108

The second analysis unit 206 performs image analysis of the third image data 30 (S108). As described above, the third image data 30 has higher resolution than the resolution of the image data analyzed by the first analysis unit 202. Therefore, in the image analysis by the second analysis unit 206, the analysis may be performed with higher accuracy than the image analysis by the first analysis unit 202.

The image analysis performed by the second analysis unit 206 is optional and may be optionally adopted according to the purpose of use of the information processing apparatus 200 or the like. For example, the image analysis performed by the second analysis unit 206 is a detection process of an object having a predetermined feature. For example, suppose that an object to be detected is a person. In this case, the predetermined feature is represented by, for example, an age group, gender, belongings on one's person, and the like.

Here, in a case where it is desired to detect a specific person, the predetermined feature represents the person's feature. The case where it is desired to detect a specific person is, for example, a case where it is desired to search the image of the surveillance camera for a criminal when the criminal of a certain incident has been determined.

Also, the second analysis unit 206 may detect a person with a specific feature rather than a specific person. A case where it is desired to detect a person with a specific feature is, for example, a case where it is desired to search the image of the surveillance camera for a suspicious person (for example, a person wearing sunglasses, a mask, and a hat).

The object to be detected is not limited to a person. For example, the object to be detected may be a car. In this case, a predetermined feature indicates, for example, a kind of car, a color, the number of the license plate, and the like.

Note that, it is preferable that an algorithm for detecting an object is set to be different depending on a kind of the object to be detected (for example, a person or a car).

The kind of image analysis to be performed by the second analysis unit 206 may be preset in the second analysis unit 206, or may be changed according to the settings of the user of the information processing apparatus 200. In the latter case, for example, the user of the information processing apparatus 200 stores information indicating the kind of image analysis to be performed by the second analysis unit 206, into a storage device which is accessible to the second analysis unit 206. The second analysis unit 206 performs the set kind of image analysis by reading out the information.

EXAMPLE 1

Figure 8:
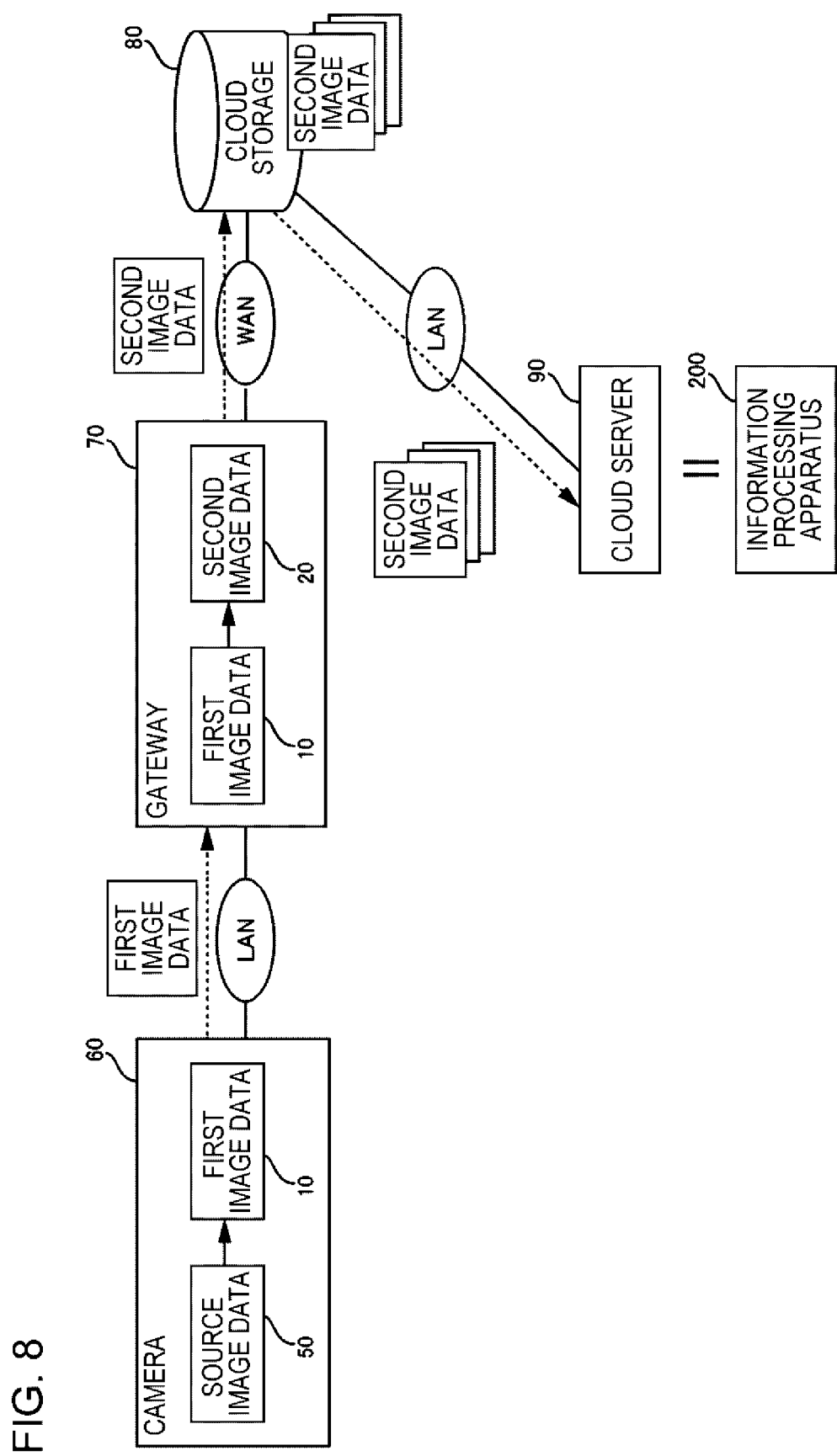
FIG. 8 is a diagram illustrating an information processing apparatus according to a first example together with its surrounding environment.

A specific implementation example of the first example embodiment will be described as a first example. FIG. 8 is a diagram illustrating the information processing apparatus 200 according to the first example together with its surrounding environment.

A camera 60 generates source image data 50 by imaging the surrounding scenery. For example, the camera 60 is a surveillance camera installed in the building. Further, the camera 60 compresses the source image data 50 to generate the first image data 10.

A gateway 70 is any device having a function of transmitting and receiving data through a Wide Area Network (WAN). The gateway 70 acquires the first image data 10 from the camera 60 through a Local Area Network (LAN). Further, the gateway 70 compresses the first image data 10 to generate the second image data 20. Then, the gateway 70 transmits the second image data 20 to a cloud storage 80 through the WAN.

The cloud storage 80 is a certain storage device available through the WAN. The cloud storage 80 stores the second image data 20 received from the gateway 70.

Here, in a case of transmitting the second image data 20 to the cloud storage 80, the gateway 70 may individually transmit each second image data 20, or may archive a plurality of second image data 20 into one file to be transmitted. In the latter case, the gateway 70 archives the plurality of second image data 20 representing, for example, a result of imaging within a predetermined period (in one minute, and the like) into one file. More specifically, this is to archive the second image data 20 corresponding to each source image data 50 generated within a predetermined period by the camera 60 into one file.

According to the configuration above, the second image data 20 representing the scenery imaged by the camera 60 is stored in the cloud storage 80. For example, in a case where the camera 60 is a surveillance camera, a series of images representing the scene of a surveilled place is stored in the cloud storage 80.

A cloud server 90 is a server machine implementing the information processing apparatus 200 of the first example. The cloud server 90 acquires the second image data 20 stored in the cloud storage 80 and performs the series of processing described above (see FIG. 5). Note that, in the case where the plurality of second image data 20 is archived in one file, the cloud server 90 acquires one or more archive files as the plurality of second image data 20 acquired in S102.

In the configuration of FIG. 8, the image data transmitted and received through the WAN is the second image data 20. Here, the second image data 20 is an image having resolution lower than the first image data 10 or the third image data 30. Therefore, in a WAN where a communication speed is slower than that of the LAN, relatively small image data is transmitted and received. Thereby, it is possible to shorten the time required for transmitting and receiving image data. Also, the communication speed required for the WAN is reduced.

Second Example Embodiment

Figure 9:
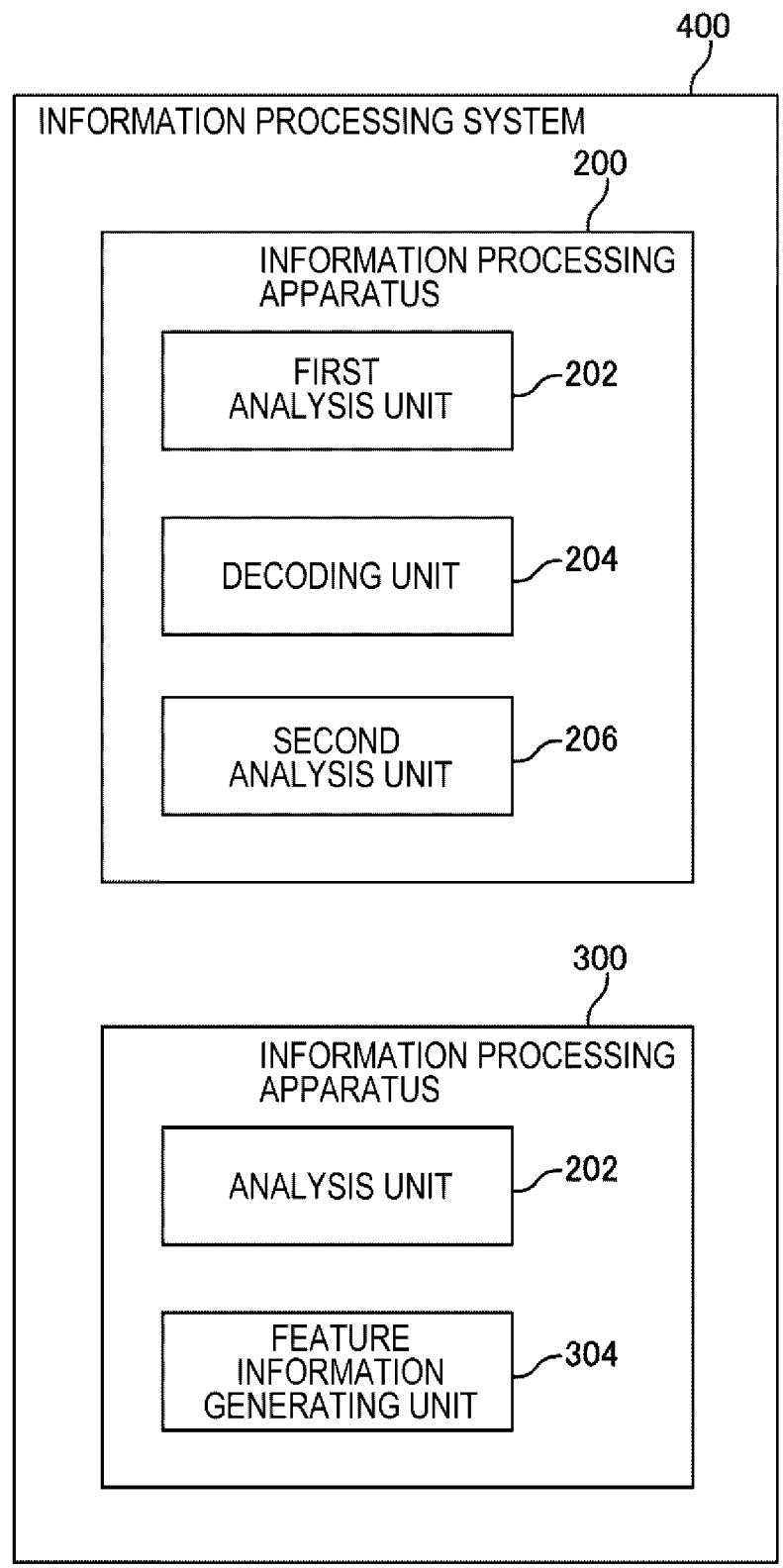
FIG. 9 is a diagram illustrating an information processing apparatus according to a second example embodiment together with its use environment.

FIG. 9 is a diagram illustrating the information processing apparatus 200 according to the second example embodiment together with its use environment. Except for the points described below, the information processing apparatus 200 of the second example embodiment has the same function as the information processing apparatus 200 of the first example embodiment.

The information processing apparatus 200 according to the second example embodiment configures the information processing system 400 together with information processing apparatus 300. The information processing apparatus 200 uses specification information generated by the information processing apparatus 300. The information processing apparatus 300 includes an analysis unit 302 and a feature information generating unit 304. The analysis unit 302 analyzes the fourth image data and detects the fourth image data satisfying a second predetermined condition. The second predetermined condition will be described later.

Figure 10:
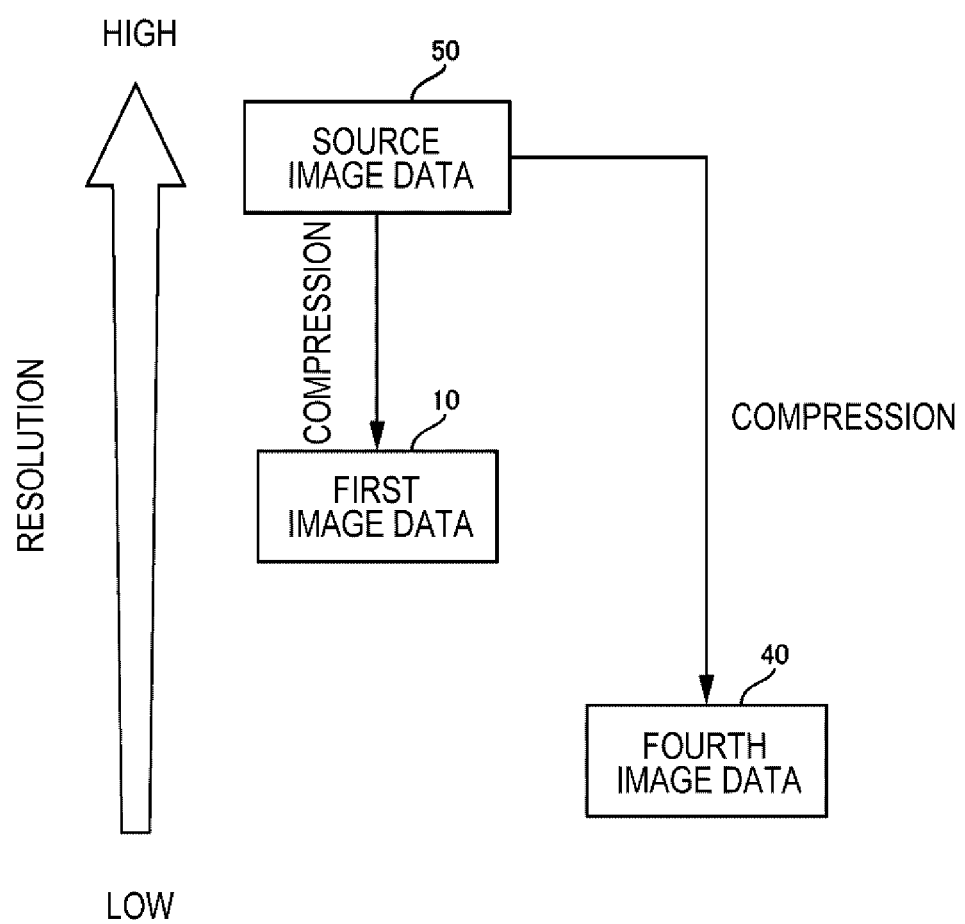
FIG. 10 is a diagram illustrating a relationship between fourth image data and another image data.

Here, the fourth image data will be described. FIG. 10 is a diagram illustrating the relationship between the fourth image data and other image data. The fourth image data 40 is generated by compressing the source image data 50. The first image data 10 is also generated by compressing the source image data 50. That is, both the first image data 10 and the fourth image data 40 are generated from the same source image data 50. Hereinafter, the first image data 10 and the fourth image data 40, which are generated from the same source image data 50 in this way, are respectively denoted as "first image data 10 corresponding to the fourth image data 40" and " fourth image data 40 corresponding to the first image data 10".

Here, as described above, the source image data 50 is non-compressed image data generated by the camera. The first image data 10 and the fourth image data 40 are generated by compressing the non-compressed image data with respectively different resolution. The resolution of the fourth image data 40 is lower than the resolution of the corresponding first image data 10. Note that, the fourth image data 40 may be generated by the same apparatus as the apparatus that generates the first image data 10, or may be generated by the other apparatuses.

The feature information generating unit 304 generates specification information that specifies the second image data corresponding to the detected fourth image data. The second image data corresponding to a fourth image data is the second image data generated by compressing the first image data corresponding to the fourth image data. Note that, the resolution of the fourth image data 40 and the second image data 20 may be the same or different.

The first analysis unit 202 of the second example embodiment acquires specification information generated by the information processing apparatus 300. Further, the first analysis unit 202 of the second example embodiment performs image analysis of the second image data 20 determined by specification information.

Flow of Processing

Figure 11:
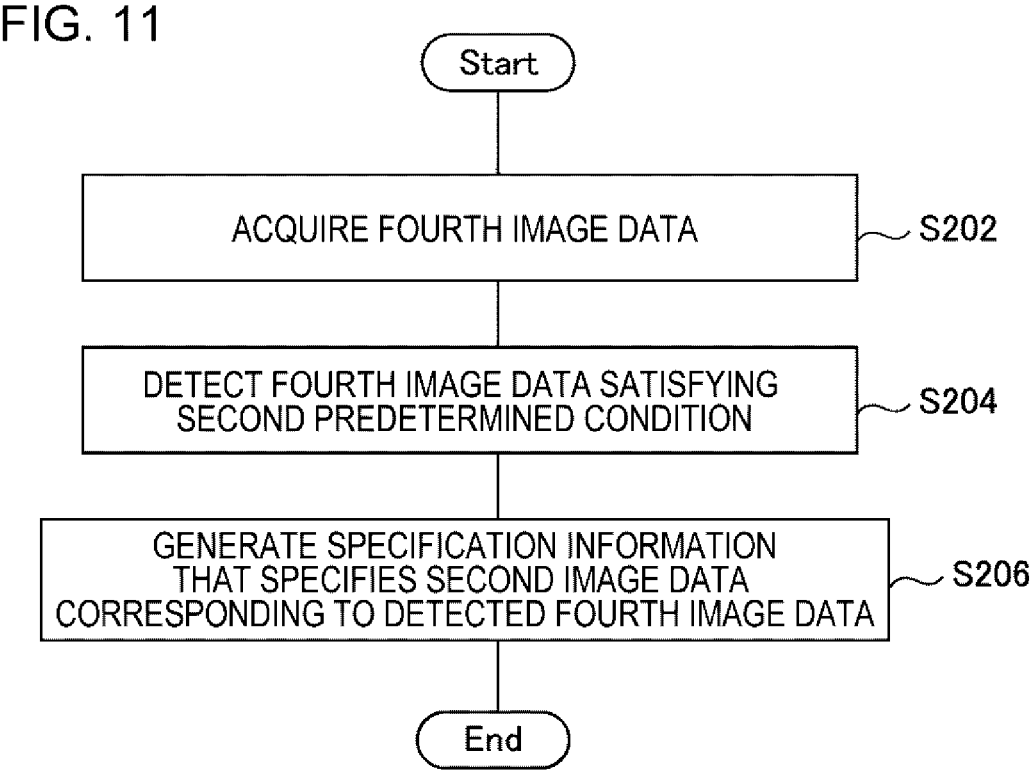
FIG. 11 is a flowchart illustrating a flow of processing executed by the information processing apparatus according to the second example embodiment.

FIG. 11 is a flowchart illustrating a flow of processing executed by the information processing apparatus 300 according to the second example embodiment. The analysis unit 302 acquires the fourth image data (S202). The analysis unit 302 performs image analysis of the fourth image data 40 and detects the fourth image data 40 satisfying the second predetermined condition (S204). The feature information generating unit 304 generates specification information that specifies the second image data corresponding to the detected fourth image data 40 (S206).

Figure 12:
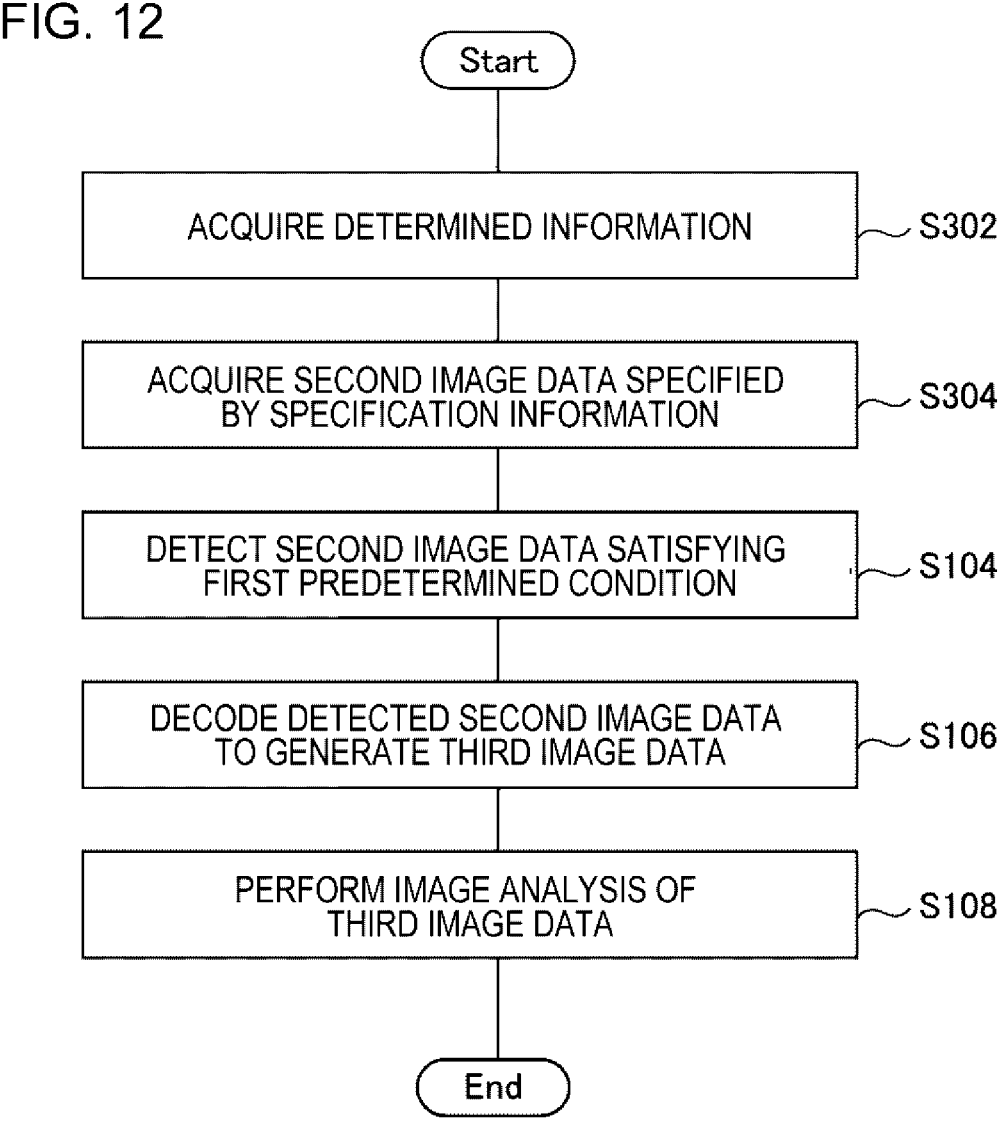
FIG. 12 is a flowchart illustrating a flow of processing executed by the information processing apparatus according to the second example embodiment.

FIG. 12 is a flowchart illustrating a flow of processing executed by the information processing apparatus 200 according to the second example embodiment. In S302, the first analysis unit 202 acquires specification information. In S304, the first analysis unit 202 acquires the second image data 20 specified by specification information. The processing performed in S104 to S108 has been described above.

Acquiring of the fourth image data 40: S202

The analysis unit 302 acquires the fourth image data 40 (S202). There are various methods in which the analyzing unit 302 acquires the fourth image data 40. For example, the analysis unit 302 acquires the fourth image data 40 by reading out the fourth image data 40 from the storage device in which the fourth image data 40 is stored. Also, for example, the analyzing unit 302 may acquire the fourth image data 40 by receiving the fourth image data 40 that has been transmitted by another apparatus (for example, an apparatus that generates the fourth image data 40).

Image analysis of fourth image data 40: S204 to S206

The analysis unit 302 performs image analysis of the fourth image data 40 to detect the fourth image data 40 satisfying the second predetermined condition (S204 and S206). The fourth image data 40 satisfying the second predetermined condition is the fourth image data 40 that needs to be subjected to the image analysis of the corresponding second image data 20 for the information processing apparatus 200 to perform.

Image analysis performed by the analysis unit 302 on the fourth image data 40 is any process. For example, the analysis unit 302 performs difference detection process or object detection process, similarly to the first analysis unit 202 of the first example embodiment.

It is preferable that the image analyses performed by the analysis unit 302 and the first analysis unit 202 are different kinds. For example, the analysis unit 302 performs difference detection process, and the first analysis unit 202 performs object detection process. Thereby, the first analysis unit 202 detects the second image data 20 referred to as "there is a change of a predetermined degree or more in the imaged scenery, and the predetermined object is included". Conversely, the analysis unit 302 may perform object detection process, and the first analysis unit 202 may perform difference detection process. Also, the kinds of processes performed by the analysis unit 302 and the first analysis unit 202 may be the same or different. In this case, however, the analysis process by the first analysis unit 202 is more detailed analysis process than the analysis process by the analysis unit 302.

Generation of Specification Information: S208

The feature information generating unit 304 generates specification information on the second image data 20 corresponding to the detected fourth image data 40. Here, specification information is any information capable of specifying the second image data. For example, specification information indicates an identifier assigned to the second image data 20, a point in time when the second image data 20 is generated, or a point in time when the original first image data 10 of the second image data 20 or the source image data is generated, and the like. The feature information generating unit 304 stores the generated specification information into a certain storage device.

A method of recognizing the second image data 20 corresponding to a certain fourth image data 40 is optional. For example, in a case where each kind of image data is generated, the metadata of each image data whose original source image data 50 is the same to each other includes a common identifier. In this case, the metadata of the fourth image data 40 and the second image data 20 which correspond to each other includes the same identifier. Therefore, by using this identifier, the feature information generating unit 304 may recognize the second image data 20 corresponding to the fourth image data 40 detected by the analyzing unit 302.

Also, for example, the metadata of each image data includes information (an identifier or a point in time of generation of the source image data 50) capable of specifying the original source image data 50. In this case, the metadata of the fourth image data 40 and the second image data 20 which correspond to each other includes information for specifying the same source image data 50. Therefore, by using this information, the feature information generating unit 304 may recognize the second image data 20 corresponding to the fourth image data 40 detected by the analyzing unit 302.

Acquiring of Specification Information: S302

The first analysis unit 202 acquires specification information (S302). There are various methods in which the first analysis unit 202 acquires specification information. For example, the first analysis unit 202 acquires specification information by reading out specification information from the storage device in which specification information is stored. Also, for example, the first analysis unit 202 may acquire specification information by receiving specification information that has been transmitted by another apparatus (for example, the information processing apparatus 300).

Image Analysis of Second Image Data 20: S304

The first analysis unit 202 detects the second image data 20 satisfying the first predetermined condition from the second image data 20 determined by specification information (S304). A method of detecting the second image data 20 satisfying the first predetermined condition has been described in the first example embodiment.

Example of Hardware Configuration

The information processing apparatus 200 of the second example embodiment is implemented by using the computer 100, similarly to the information processing apparatus 200 of the first example embodiment (see FIG. 3). In the example embodiment, each program module stored in the storage device 108 described above includes a program for implementing each function of the information processing apparatus 200 according to the example embodiment.

As described above, according to the example embodiment, the information processing apparatus 300 performs image analysis of the fourth image data 40 to detect the fourth image data 40 that needs to be subject to image analysis for the corresponding second image data 20. Then, the information processing apparatus 200 performs image analysis of the second image data 20 corresponding to the fourth image data 40. In this way, by an apparatus different from the information processing apparatus 200, the second image data for the information processing apparatus 200 to perform image analysis 20 is determined. Thereby, the processing load of the image analysis in the information processing apparatus 200 is reduced.

EXAMPLE 2

Figure 13:
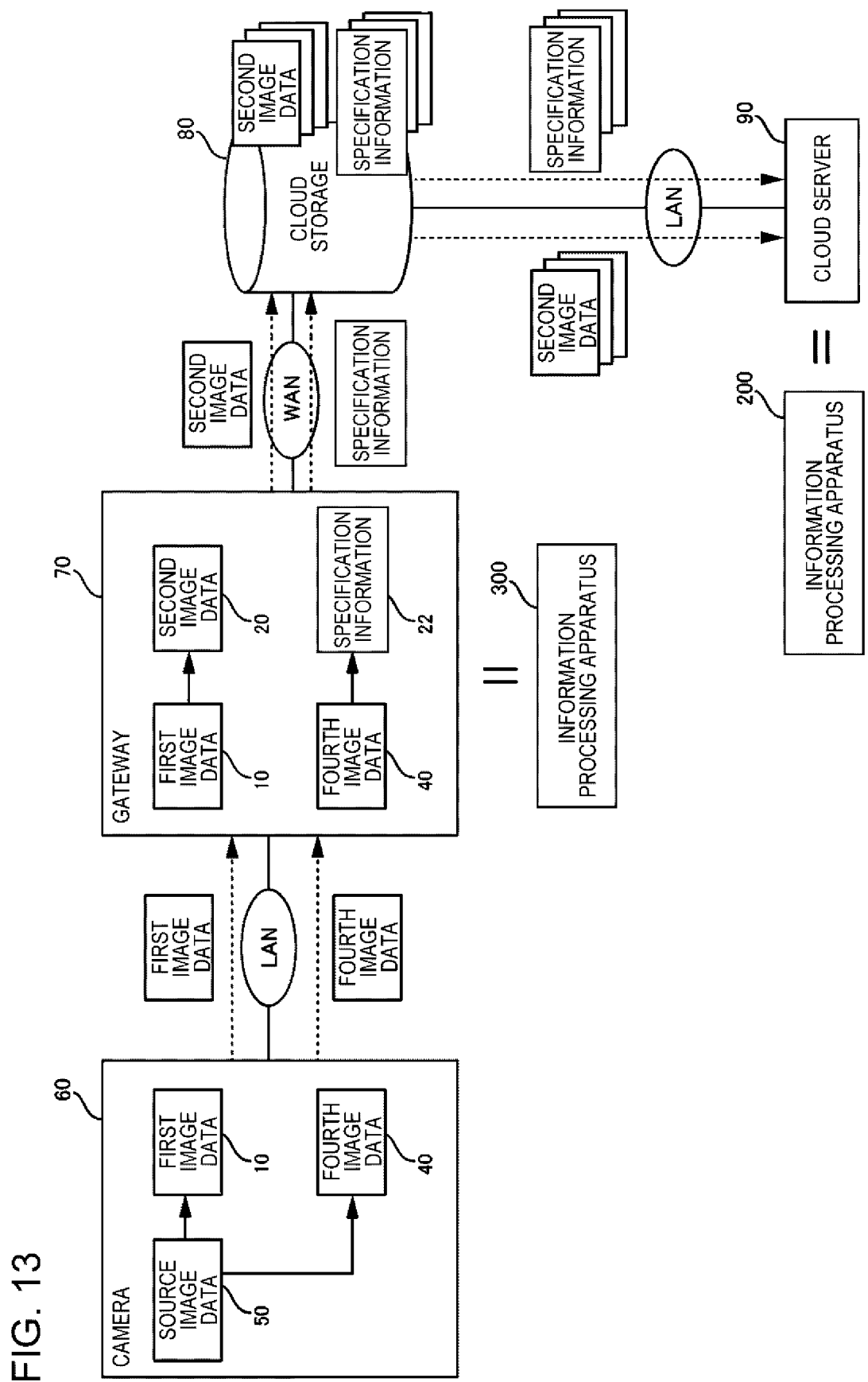
FIG. 13 is a diagram illustrating an information processing apparatus according to a second example together with its surrounding environment.

A specific implementation example of the second example embodiment will be described as a second example. FIG. 13 is a diagram illustrating the information processing apparatus 200 according to the second example together with its surrounding environment.

In addition to generating the first image data 10 from the source image data 50, the camera 60 generates the fourth image data 40 from the source image data 50.

In the second example embodiment, the information processing apparatus 300 is implemented as a gateway 70. The gateway 70 acquires the first image data 10 and the fourth image data 40 from the camera 60. A way of handling the first image data 10 is the same as in the first example embodiment.

The gateway 70 performs image analysis of the fourth image data 40 to detect the fourth image data 40 satisfying the second predetermined condition. Further, the gateway 70 generates specification information 22 that specifies the second image data 20 corresponding to the detected fourth image data 40. Then, the gateway 70 transmits the specification information 22 to the cloud storage 80.

The cloud storage 80 acquires and stores the second image data 20 and the specification information 22 that has been received from the gateway 70.

Here, in a case where the second image data 20 is transmitted to the cloud storage 80, the gateway 70 may archive the specification information 22, similarly to the second image data 20. For example, the gateway 70 archives a predetermined number of the specification information 22 to generate one archive file.

The cloud server 90 acquires the specification information 22 stored in the cloud storage 80. Further, the cloud server 90 acquires the second image data 20 specified by the specification information 22, from the cloud storage 80.

According to the configuration of FIG. 13, the generation of the specification information 22 is performed by the gateway 70. That is, an apparatus of generating the second image data 20 from the first image data 10 and the apparatus of performing the image analysis of the fourth image data 40 to generate the specification information 22 are integrated into one. Therefore, it is possible to reduce the cost of preparing the apparatus.

Also, since the cloud server 90 only needs to perform image analysis of only the second image data 20 specified by the specification information 22, an amount of computer resources consumed by the cloud server 90 is reduced. In a case where the cloud server 90 is a rental server, a rental cost of the cloud server 90 is often determined according to the amount of computer resources consumed by the cloud server 90. Therefore, by reducing the amount of computer resources consumed by the cloud server 90, the rental cost of the cloud server 90 may be reduced.

Although the example embodiments of the present invention have been described with reference to the drawings, these are examples of the present invention, and combinations of the example embodiments or various configurations other than the above may also be adopted.

The invention claimed is:

1. An information processing apparatus comprising:
a memory storing instructions; and
a processor configured to execute the instructions to:
acquire second image data generated by encoding first image data by a predetermined encoding method;
perform image analysis of the second image data to detect second image data satisfying a first predetermined condition;
decode the detected second image data into third image data having higher resolution than that of the second image data; and
perform image analysis of the third image data,
wherein with respect to image data obtained by decoding a part of an image region of the second image data, the processor further configured to perform image analysis on the decoded part of the image region to detect second image data satisfying the first predetermined condition,
wherein the processor is further configured to acquire a plurality of the second image data,
the plurality of the second image data is time-series image data, and
the processor is further configured to perform a difference detection process on the plurality of second image data to detect second image data for which a difference of a predetermined degree or more is detected, as second image data satisfying the first predetermined condition.

2. The information processing apparatus according to claim 1, wherein the predetermined encoding method is classified into a progressive encoding method.

3. The information processing apparatus according to claim 1, wherein the processor is further configured to perform object detection process on the second image data to detect second image data including the first predetermined object, as second image data satisfying the first predetermined condition.

4. The information processing apparatus according to claim 1, wherein the processor is further configured to perform image analysis on image data obtained by decoding the second image data to detect second image data satisfying a first predetermined condition.

5. A control method executed by a computer, comprising:
acquiring second image data generated by encoding first image data by a predetermined encoding method;

performing image analysis of the second image data to detect the second image data satisfying a first predetermined condition;

decoding the detected second image data into third image data having higher resolution than that of the second image data; and performing image analysis of the third image data, wherein with respect to image data obtained by decoding a part of an image region of the second image data, performing image analysis on the decoded part of the image region to detect second image data satisfying the first predetermined condition, wherein the method further comprises acquiring a plurality of the second image data, the plurality of the second image data is time-series image data, and the method further comprises performing a difference detection process on the plurality of second image data to detect second image data for which a difference of a predetermined degree or more is detected, as second image data satisfying the first predetermined condition.

6. A non-transitory computer-readable storage medium storing a program causing a computer to execute each step provided in the control method according to claim 5.

7. An information processing apparatus comprising:

a memory storing instructions; and a processor configured to execute the instructions to:

acquire a plurality of second image data generated by encoding first image data by a predetermined encoding method;

acquire specification information that specifies second image data satisfying a second predetermined condition;

perform image analysis of second image data specified by the specification information to detect second image data satisfying a first predetermined condition;

decode the detected second image data into third image data having higher resolution than that of the second image data; and perform image analysis of the third image data, wherein fourth image data having lower resolution than that of the first image data is generated, the first image data and the fourth image data are generated by encoding common image data with respectively different resolution, difference detection process is performed on fourth image data corresponding to each of the plurality of second image data such that the second image data satisfying the second predetermined condition corresponds to fourth image data for which a difference of a second predetermined degree or more is detected, and second image data corresponding to the fourth image data is generated by encoding first image data generated from the same image data as the fourth image data.

8. The information processing apparatus according to claim 7, wherein fourth image data having lower resolution than that of the first image data is generated, the first image data and the fourth image data are generated by encoding common image data with respectively different resolution, second image data satisfying the second predetermined condition is second image data corresponding to fourth image data including a second predetermined object, and second image data corresponding to the fourth image data is second image data generated by encoding first image data generated from the same image data as the fourth image data.

* * * * *